United States Patent [19]

Benson et al.

[11] Patent Number: 4,729,398

[45] Date of Patent: Mar. 8, 1988

[54] CURRENT-TO-PRESSURE TRANSDUCERS

[75] Inventors: Richard A. Benson, Bedford; Daniel E. Smith, Weston, both of Mass.

[73] Assignee: Bellofram Corp., Burlington, Mass.

[21] Appl. No.: 5,262

[22] Filed: Jan. 20, 1987

[51] Int. Cl.⁴ .................. G05D 16/00; F16K 13/02
[52] U.S. Cl. ............................. 137/82; 251/129.08
[58] Field of Search ............... 137/82, 83, 85, 625.14, 137/625.62; 251/129.08

[56] References Cited

U.S. PATENT DOCUMENTS 3,942,558  3/1976  Honda ........................... 137/83 X
4,554,938  11/1985  Twisselmann ..................... 137/82

Primary Examiner—Alan Cohan
Attorney, Agent, or Firm—James E. Mrose

[57] ABSTRACT

In a current-to-pressure (I/P) transducer which controls output pressures by rapidly and precisely venting pressures of fluid derived from a supply, the movable valve member employed in the venting comprises a mechanically-balanced low-mass armature suspended for restrained pivotal movements by a taut band and incorporating readily-saturated magnetic material disposed in gap-bridging relation to core elements of a stationary electromagnet; the counterbalancing and taut-band suspension of but a small mass renders the armature highly resistant to adverse effects of vibration, and selectable positioning of the venting-valve seat or port to cooperate with one or the other end of the pivoted armature allows for direct or inverse responses to currents fed to the electromagnet.

13 Claims, 6 Drawing Figures

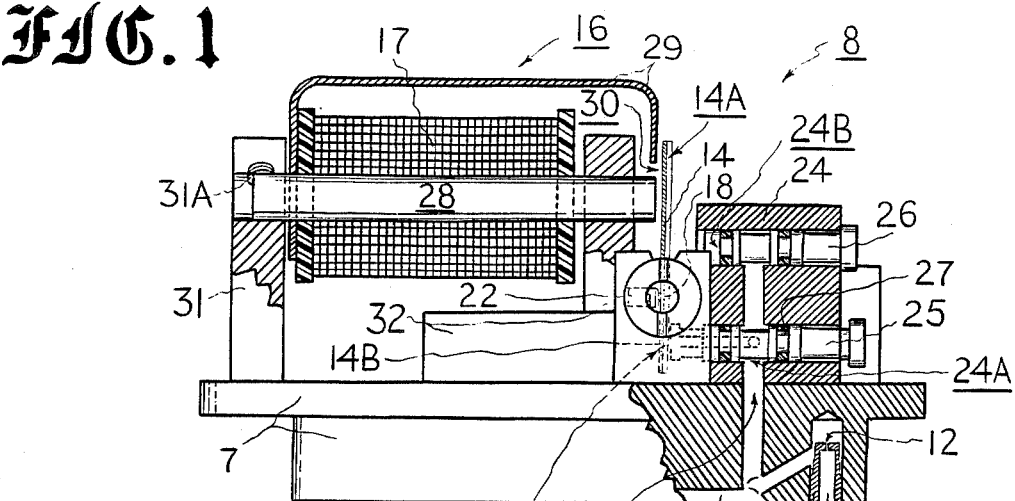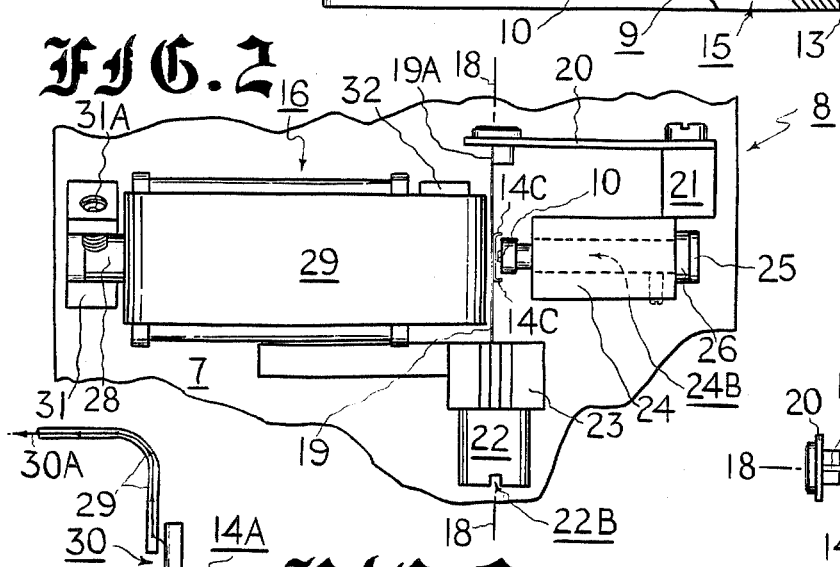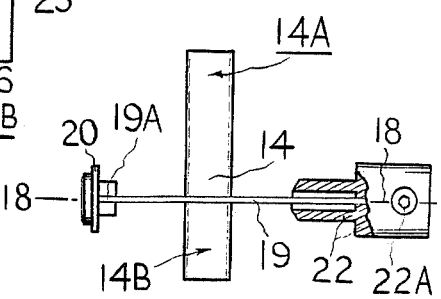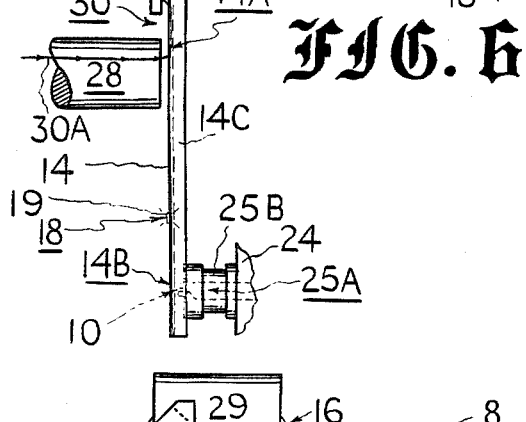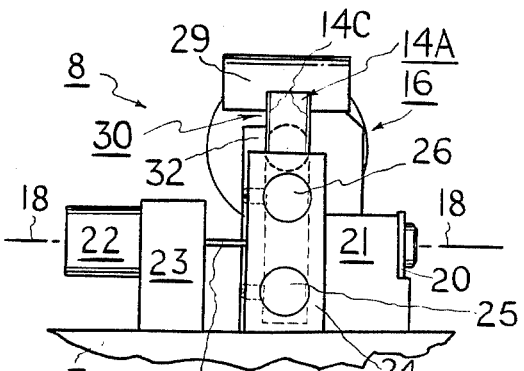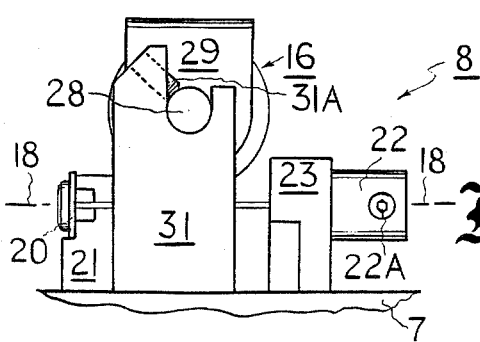

CURRENT-TO-PRESSURE TRANSDUCERS

BACKGROUND OF THE INVENTION

The present invention relates to improvements in current-to-pressure (I/P) transducers of uncomplicated form which can operate swiftly and precisely although rendered highly immune to mechanical disturbances such as those of vibration, and, in one particular aspect, to unique high-performance I/P equipment of rugged and simplified construction having a movable bleed-valving armature advantageously fashioned as an electrically-unexcited lightweight thin blade pivoted transversely by an adjustable-torque taut band, magnetic material of the blade being disposed in a gap-shunting interacting relation with the core of a stationary electromagnet, and either of two flapper-valve portions of the same blade being in valving relation to a nozzle whose controlled leakage regulates an output pressure.

Control of pneumatic output pressures in accordance with electrical signals applied to bleed-type electromagnetic valving is a well-established practice, typically with the objective of supplying appropriate operating pressures to a pneumatically-actuated fluid-flow valve disposed in a system flow path. For such purposes, the needed operating pressures are commonly derived from a main pressurized source with the aid of a flow restriction and a leakage port, the latter being variably throttled by a movable valving member whose positions are automatically regulated electromagnetically. In the latter connection, so-called current-to-pressure (I/P) transducers provide the throttling function, in response to system control signals which, making good use of natural characterisitics and capabilities of modern electronic equipment, are preferably in the form of electrical currents. Such control signals have been driven through movable coils interacting with stationary permanent magnets, for example, thereby developing forces needed to adjust throttling by a levered valving member; U.S. Pat. Nos. 2,964,051 and 4,336,819 describe apparatus of that type. In other arrangements the coils have been held stationary, as parts of electromagnets which interact with and effect movements of magnetic material, and, which, in turn, cause related throttling movements of a valving member. Examples of such stationary-coil transducers are disclosed in U.S. Pat. Nos. 3,155,104, in which a hinged lever carries an armature attracted to the electromagnet, and U.S. Pat. No. 3,768,772, in which the movements of an armature and its associated valve member are kept linear by a parallelogram-type spring support, and U.S. Pat. No. 3,982,554, in which a flapper valve member pivots over a nozzle in the magnetic path of an electromagnet, and U.S. Pat. No. 4,579,137, in which a plastic diaphragm mounts a magnetic button over a nozzle formed in the center post and core of a special form of electromagnet. For I/P transducers to operate at the rapid speeds and with the precise repeatabilities needed to insure high-quality performance, their mechanically-movable components should not involve either large mass or superfluous or uncertain restraints. The moving-coil versions, which require flexible electrical connections, tend to offend in both respects and the problems with stationary-coil versions tend more to be concerned with armature inertia and with associated supports which allow for needed throttling motions. As is explained in detailed disclosures which follow, unique and improved transducers of a stationary-coil type advantageously employ a special taut-band armature suspension and restraint; prior moving-coil measuring instruments have utilized other forms of taut band, U.S. Pat. No. 3,277,370 providing an example of same.

SUMMARY OF THE INVENTION

The present invention is aimed at creating improved and relatively uncomplicated current-to-pressure transducers, such as I/P transducers useful in control of the operation of fluid valves, in which high precision can be realized with equipment of economical manufacture, and in which preferred operating characteristics are promoted by interacting a stationary electromagnet with a readily-saturable low-mass armature supported and restrained by a readily-adjustable taut band. In a preferred embodiment, the movable armature is in the form of an elongated thin strip of high-permeability magnetic material, stiffened by its shallow-channel configuration, and suspended transversely by a fine angularly-adjustable taut metal band which orients one end of the armature in closely-spaced overlapping shunting relation to pole portions of the magnetic core of a stationary electromagnet which confront one another across a gap, and which further orients a part of the same armature in a flapper-valving relation to a bleed nozzle of a regulated-pressure pneumatic system. The armature material, and its small thickness, enables magnetic saturation to be achieved at a small current level in the electromagnet, thereby effectively eliminating that possible variable as a source of error, and at least some measure of mass counterbalancing is brought about by transversely attaching the taut band to the armature at a suitable position between its ends. The last-mentioned counterbalancing aids in isolating the movable armature structure from deleterious influences of vibration, shock and changing or unusual spatial attitude, and the same is also especially true of the small total mass of movable material involved, and of the contributions of the relatively rugged and stable taut band. Transducer operation is adjustable not only as the result of varying the angular twist or torque applied by the suspension band but also by setting the position of the nozzle orifice in relation to the armature, and, in addition linearization of the generally square-law response characteristic of the transducer electromagnet arrangement can be effected by compensations involving the areas and shapings of the pole portion overlapped by the armature.

Accordingly, it is one of the objects of the present invention to provide a novel and improved current-to-pressure transducer of economical yet high-performance construction, in which pneumatic throttle-valving is by way of a lightweight magnetically-saturable movable armature suspended by an adjustable taut band in cooperating relation to both a stationary electromagnet and valving nozzle, such that the unit inherently resists adverse influences of vibration and the like.

A further object is to reduce complexity and enhance quality of performance and provide mechanical isolation in I/P transducers utilizing a simple low-inertia pivotless armature which is readily saturable and which forms part of the magnetic circuit of a relatively stationary electromagnet whose operating characteristics advantageously lend themselves to linearization.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 is a side elevational view, partly cross-sectioned, of an improved electropneumatic current-to-pressure (I/P) transducer suitable for use in association with a fluid-supply system whose output pressure is to be closely controlled;

FIG. 2 portrays a portion of the same transducer in a top plan view;

FIG. 3 is an end view of the same transducer, looking toward the left in FIGS. 1 and 2;

FIG. 4 is a further end view of the same transducer, looking toward the right in FIGS. 1 and 2;

FIG. 5 is a pictorial detail, partly cross-sectioned, of taut-band suspension elements carrying the movable member which serves as both a flapper valve and electromagnetically-operated armature of the transducer, viewed in their setting shown in FIG. 4; and FIG. 6 illustrates on a somewhat enlarged scale the suspended movable member of the same transducer, from the front in FIGS. 1 and 2, together with fragments of the transducer, including portions of the electromagnetic core structure with which it interacts.

DESCRIPTION OF THE PREFERRED EMBODIMENT

Having reference to the drawings, wherein like numbers and characters designate identical or corresponding parts or features throughout the several views, and more particularly to FIG. 1 thereof, the base 7 of a current-to-pressure transducer unit 8 is shown to have the usual type of port provision 9 which is to communicate gaseous pressures to and from an orifice of a flapper-valve nozzle 10 (FIGS. 1, 2 and 6). Such a valve conveniently serves to vent or "bleed" some of the air from the output side of the unit, represented by the inlet 11, after there has first been a pressure-dropping excursion through the orifice 12 of a restrictor 13. Depending upon the extents to which the valve nozzle 10 is throttled by a nearby movable armature 14, the pressures developed in port 9 will be affected and will, in turn, be reflected in the communicating base chamber illustrated in part at 15. Typically, such a chamber, 15, is part of a pneumatic amplifier or "booster" arrangement which separately controls a main valving of the unit pneumatic input to realize the desired pressures on the output side; such auxiliary features and related practices, not illustrated, are well known in the art and therefore need not be elaborated upon here. Also long well known (and not illustrated) is the matter of accomplishing the desired throttling of a bleed nozzle in such a system by way of some form of electromagnetic actuation, such that changes in a remotely-sensed condition, expressed by related electrical control currents, may conveniently be used to effect corresponding changes in the output pressures and, hence, changes in the main controls exercised by a pressure-responsive valve or the like. Electromagnet 16 is involved in such functions, in that it includes a stationary winding 17 to which electrical currents may be applied to cause related forces to be exerted upon the proximate end 14A of the movable armature 14; those forces result in torque, about a suspension axis 18—18, which urges another portion of the armature, 14B, into desired throttling relationships with the juxtaposed nozzle orifice 10.

Importantly, the elongated armature 14 is only of relatively small mass, and is suspended solely by a taut spring-metal band 19 fixed with it in transverse relation, along the axis 18—18 (FIGS. 2 and 5, in particular). Further, that armature is preferably fashioned entirely of magnetic material, and is relatively thin, being stiffened and strengthened by the turning of its edges into marginal ridges 14C extending its full length and causing its transverse cross-section to take the form of a shallow channel (FIG. 2). Thinness of the armature material not only makes possible the desirably small mass, and a related advantageous capability of pivotally suspending and restraining that small mass in any orientation by means of a minute taut band, but also allows for its beneficial magnetic saturation even under conditions of low-level excitation of the associated electromagnet 16. Band 19 is thin, flat and initially straight, although it may undergo slight twisting as torques are exerted about the axis 18—18; its bonding transversely across the armature 14 is preferably along contiguous abutting flat surfaces and by a welding technique which maintains assured mechanical integrity. At one end, 19A (FIGS. 2 and 5), the band is held fast at the free end of a spring-action cantilevered arm 20 secured to an upstanding stationary support 21, and spring-tensioning and resulting taut alignment of the band along its axis of elongation (18—18) is maintained by firm pull exerted upon its opposite end by an angularly-adjustable fitting 22 axially restrained in a further stationary support 23. Fitting 22 is of course fixed with that opposite end of the band, as with the aid of a set screw 22A, and a slotting 22B (FIG. 2) along the exposed outside of its enlarged outer end allows for its angular adjustment, and that of the band, by an implement which makes a screwdriver-like connection.

The suspension of armature 14 by band 19 is enough between its ends to effect some mass-counterbalancing about the pivot axis 18—18, and sufficient lengths of armature are disposed both above and below that axis to permit their flapper-valve throttling interactions with nearby nozzle orifices also situated either above or below that axis. Because of such provisions, the unit's throttling responses to armature-actuating angular forces about the pivot axis may, selectably, be made to be of either the same or opposite sense. For the latter purposes, the aforementioned pressure-bleed port 9 extends upwardly from base 7 into a sealed bracket 24 and into communication with two vertically-spaced transversely-extending bores, 24A and 24B (FIG. 1), into which are fitted spool-type members 25 and 26 (FIGS. 1, 2 and 3) each having a reduced-diameter central section communicating with the port 9 and larger-diameter lateral sections sealed by resilient O-rings such as 27. One of the spool members, 26, as used for the illustrated operating conditions, serves as a mere plug, while the other, 25, has a longitudinal passageway 25A (FIG. 6) through half its length, communicating in the middle with the reduced-diameter section and, at its projecting outer nozzle end, 25B, where the orifice 10 appears in confronting relation to the lower flapper-valving end of armature 14. Accordingly, as illustrated, the nozzle orifice is throttled more as the current in the coil 17 of electromagnet 16 is increased, and less as it decreases. When, on the other hand, the positions of the passive plug spool member 26 and the active nozzle spool member 25 are reversed, the nozzle orifice 10 will lie above axis 18—18 and there will be less throttling as electromagnet current increases, and more as it decreases. The spool members are purposely fashioned for ready interchangeability allowing such reversals in operating mode, and the active nozzle spool 25 can be adjusted axially, using its exposed enlarged end and cooperating set screw while sealing is maintained by its O-rings, to adjust, in turn, the positioning of its orifice 10 in relation to that part of the armature 14 which will effect the throttling.

Magnetic flux-path circuitry for the control electromagnet 16 is developed by three principal elements, including, first, a central core 28 for the encircling annular winding 17, and, second, a return strap or leg 29 intimately mated in essentially gapless adjoining relation to one end of core 28 and spaced from its opposite end by a gap 30, and, third, the upper end 14A of the armature, which is oriented in a closely-spaced and overlapping gap-shunting relation to the adjacent free ends of the core and return strap. Surfaces of the core and strap which are disposed in confronting relation to the cooperating armature end 14A are preferably flat and lie in the same plane, and the effective gap 30 is made suitably larger than the total effective summed gaps between the armature and adjacent surfaces of the core and strap, such that the preferred magnetic-flux path involves the bridging armature end 14A rather than primarily gap 30 alone. That arrangement results in forces of attraction which draw armature end 14A toward contact with those core and strap surfaces whenever control winding 17 is energized and generates an electromagnetic field concentrated in the aforementioned flux-path circuitry. Other nearby materials, which might cause leakage or other spurious flow of magnetic flux away from the site of the gap 30 and armature end 14A, are preferably made non-magnetic or shaped and disposed so that they will not have such unwanted influences; that is true of the brackets 21 and 32 supporting the core 28 on the base, for example. Substantially all of the electromagnet flux, represented by arrowed linework 30A (FIG. 6), is thus concentrated where it will maximize the related torques exerted on the armature, and where it will tend to saturate the relatively thin armature material even when the control currents in winding 17 are not relatively large. As armature end 14A is attracted toward closure of gap 30, its tendencies toward such angular movement are resisted by the opposing angular restraint imposed by the taut band 19, and by the opposing torques developed as air escaping from orifice 10 impinges upon the throttling or flapper-valving portion 14B of the armature. In an alternative operating mode which places the nozzle orifice above the axis, the throttling-induced torques will of course be of the same angular sense as the electromagnetically-created torques, with only the taut band torsion being opposite. Mechanical force responses of the armature to the control currents applied to the electromagnet winding tend to be related in accordance with a square-law characteristic, and desirable linearization of such a characteristic can be promoted by compensatory shaping of pole faces of and the gapping between the core and strap. However, the further variables which would be expected were the armature material not magnetically saturated over essentially its full range of cooperative interaction with the electromagnet should be avoided if the best potential for such linearization is to be realized; it is therefore distinctly advantageous from that standpoint that the armature magnetic material at end 14A be kept relatively thin over the course of the shunting flux path it provides, thereby insuring that saturation will occur even when the lowest levels of control current are being experienced by the electromagnet.

In another arrangement, the armature may be made, albeit with some complexity, as a composite of a thin member of magnetic material, at the gap-shunting site, and a different member which serves mainly as the flapper-valve and as a support for the magnetic material. Or, the preferred construction, involving a light-weight one-piece armature, may have a reinforced configuration other than that of a shallow channel, such as a Z- or I-shaped cross-section. Longitudinal adjustments of the electromagnet 16 can be made with the aid of a set screw 31A in one of its support brackets, to help bring about an optimum orientation of the coplanar core and strap end surfaces in their closely-spaced relation to the armature end 14A. In other versions, and particularly where the aforementioned type of linearization is to be influenced, that end surface of the core 28 may be non-circular, and the return leg 29 may be formed as part of the core-support structure and/or may have its end shaped to cooperate with the core end so as to form a gap, like that at 30, having a different configuration and consequent different influence upon the distribution of magnetic flux there. The suspension involving taut band 19 is preferably fashioned using a single thin flat metallic ribbon, although filamentary suspensions of other cross-sectional shape, or consisting of more than a single uninterrupted length, may be utilized to realize the advantage of a very effective resistance to disturbances of the pivoted-armature operation under adverse conditions related to shock, vibration and orientation of its support axis. Accordingly, it should be understood that the specific embodiments and practices described and shown in connection with this specification have been presented by way of disclosure rather than limitation, and that various modifications, combinations and substitutions may be effected by those skilled in the art without departure either in spirit or scope from this invention in its broader aspects and as set forth in the appended claims.

What we claim as new and desire to secure by Letters Patent of the United States is:

1. Apparatus for governing the valved condition of a supply of fluid in accordance with electrical control signals, including a passageway communicating with said supply of fluid, and input terminals at which said control signals are impressed, comprising: an armature angularly movable about a support axis, valve means having a stationary nozzle communicating with said passageway and disposed for throttling by said armature which is variable with angular orientation of said armature about said axis, an electromagnet including stationary electrical winding means energized from said terminals and inductively associated with a stationary core of magnetic material and driving magnetic flux therethrough and across a magnetic gap between nearby ends of said core, and taut filament means supporting said armature for adjustable torsionally-restrained angular movements about said axis between spaced relatively stationary mounts, said armature having thin magnetic material thereof disposed in proximate overlapping flux-shunting relation to said ends of said core and siad gap therebetween, said thin magnetic material of said armature being substantially flat and elongated in a direction transverse to said axis and being of relatively high permeability and readily saturable by flux transversing it from said electromagnet even when currents flowing in said winding are relatively low, and surfaces of said ends of said core overlapped by said thin magnetic material of said armature being substantially flat and coplanar, whereby said armature simultaneously experiences torques about said axis caused by said taut filament means and by fluid impinging upon it from said nozzle and by forces of magnetic interaction between its said thin magnetic material and said stationary core.

2. Apparatus for governing the valved condition of a supply of fluid in accordance with electrical control signals, including a passageway communicating with said supply of fluid, and input terminals at which said control signals are impressed, comprising: an armature angularly movable about a support axis, valve means having a stationary nozzle communicating with said passageway and disposed for throttling by said armature which is variable with angular orientation of said armature about said axis, an electromagnet including stationary electrical winding means energized from said terminals and inductively associated with a stationary core of magnetic material and driving magnetic flux therethrough and across a magnetic gap between nearby ends of said core, and taut filament means supporting said armature for adjustable torsionally restrained angular movements about said axis between spaced relatively stationary mounts, said taut filament means comprising a single-length filament held taut between said mounts, at least one of said mounts being angularly adjustable to regulate torques experienced by said filament about said axis, said armature being bonded to said filament between ends of said filament, said armature having thin magnetic material thereof disposed in proximate overlapping flux-shunting relation to said ends of said core and said gap therebetween, whereby said armature simultaneously experiences torques about said axis caused by said taut filament means and by fluid impinging upon it from said nozzle and by forces of magnetic interaction between its said thin magnetic material and said stationary core.

3. Apparatus as set forth in claim 2 wherein said one of said mounts includes an angularly-adjustable fitting fixed with one end of said filament and held in a first stationary bracket, and wherein the other of said mounts includes a second stationary bracket supporting one end of a cantilevered spring member having its other end fixed in tension-applying relation to the other end of said filament.

4. Apparatus as set forth in claim 3 wherein said taut filament is in the form of a thin, flat and elongated narrow band of spring metal having elastic resistance to torsion.

5. Apparatus as set forth in claim 1 wherein said elongated armature consists of a single strip of said thin magnetic material which is rendered relatively stiff in relatively lightweight form by at least one longitudinally-extending ridge, different flat surfaces of said armature being disposed to overlap said ends of said core and to act as a flapper valve in relation to said nozzle.

6. Apparatus as set forth in claim 5 wherein both longitudinally-extending edges of said armature are turned into marginal edges which impart a shallow channel-like cross-section to said armature, said taut filament means being affixed to said elongated armature intermediate the ends thereof between ends of said filament means.

7. Apparatus as set forth in claim 6 wherein said taut filament means supports said armature with one of its flat sides disposed to overlap said ends of said core and with the other of its flat sides disposed adjacent said nozzle in position to have said fluid impinge upon it from said nozzle and to act as the said flapper valve.

8. Apparatus as set forth in claim 9 wherein one portion of said one of said flat sides which overlaps said ends of said core lies at an outer extremity of said elongated armature radially removed from said filament means and said axis, and wherein said valve means selectably orients said stationary nozzle adjacent a portion of said other of said flat sides which lies radially either on the same or opposite side of said filament means and said axis as said one portion.

9. A current-to-pressure transducer which bleeds fluid pressures from a branch line connected to a pneumatic source through a restriction to establish a control pressure responsive to electrical currents characterizing a sensed condition, comprising: a base having a fluid port in communication with the said branch line; a nozzle support bracket on said base having an interior fluid passageway communicating with said port and at least one cylindrical bore therethrough intercepting said passageway; a spool-type nozzle member fitted within said bore and having a longitudinal fluid path therethrough communicating at an outer end with a nozzle opening and with said interior passageway intermediate its ends; O-rings maintaining said spool-type nozzle member sealed within said bore and allowing axial movements thereof which adjust valving positions of said nozzle opening externally of said bracket; an elongated and relatively lightweight one-piece armature of relatively thin and flat-sided material having relatively high magnetic permeability; an adjustable taut-band suspension mounting said armature for angular movements about an axis transverse to the direction of its elongation and with a first flat side surface thereof disposed adjacent said nozzle opening to act as a flapper valve, said suspension including a narrow flat metal band fixed with said armature along said axis, and spaced mounts on said base holding said band in tension along said axis and angularly adjustable to develop elastic torsional restraints in said band about said axis; electromagnet means having a winding connected for electrical excitation by the said electrical currents and inductively associated with a gapped core of magnetic material and driving magnetic flux therethrough and across a magnetic gap between nearby ends of said core, said ends of said core having pole surfaces which are substantially flat and coplanar; and means mounting said electromagnet means on said base in substantially stationary relation thereto and with said pole surfaces of said ends of said core overlapped by a closely-spaced second flat side surface of said armature.

10. A current-to-pressure transducer as set forth in claim 9 wherein said elongated armature is substantially straight and is fixed with said taut band at a position between its ends, said nozzle opening being disposed adjacent said first flat side surface of said armature on a side of said axis substantially diametrically opposite said second flat side surface and said ends of said core.

11. A current-to-pressure transducer as set forth in claim 10 wherein said nozzle support bracket has a second cylindrical bore therethrough intercepting said passageway and oriented substantially parallel with said one cylindrical bore, a spool-type plug member fitted within said second bore, and O-rings maintaining said plug member sealed within said second bore, and with it blocking fluid leakage from said second bore, said nozzle member and plug member being selectably interchangeable in said bores, said nozzle opening being disposed adjacent said first flat side surface of said armature on the same side of said axis as said second flat side surfaces and said ends of said core when said nozzle member is fitted within said second bore.

12. A current-to-pressure transducer as set forth in claim 11 wherein said thin material of said armature which overlaps said pole surfaces of said core is readily saturable by flux traversing it from said electromagnet even when currents flowing in said winding are relatively low, and wherein said armature is rendered relatively stiff by longitudinally-extending bent marginal edges which impart a shallow channel-like cross-section to said armature.

13. A current-to-pressure transducer as set forth in claim 12 wherein said core of electromagnet means includes a first substantially cylindrical core member having one end held by said mounting means in longitudinally-adjustable relation thereto, said cylindrical core member being encircled by said winding and having another end forming one of said pole surfaces, and a strap-like second core member united with said first core member near said one end thereof and extending around said winding toward said other end and both forming said gap therewith and forming another of said pole surfaces adjacent said second flat side surface of said armature.

* * * * *